US012071989B2

(12) United States Patent
Adkins et al.

(10) Patent No.: US 12,071,989 B2
(45) Date of Patent: Aug. 27, 2024

(54) BRAKE ASSEMBLY HAVING A RETRACTION SPRING

(71) Applicant: ArvinMeritor Technology, LLC, Troy, MI (US)

(72) Inventors: Alex Adkins, Troy, MI (US); Daniel Philpott, Goodrich, MI (US); Phil Leicht, South Lyon, MI (US); Matthew McGinn, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 322 days.

(21) Appl. No.: 16/788,556

(22) Filed: Feb. 12, 2020

(65) Prior Publication Data

US 2021/0246952 A1 Aug. 12, 2021

(51) Int. Cl.
*F16D 65/097* (2006.01)
*F16D 55/22* (2006.01)
*F16D 65/00* (2006.01)
*F16D 127/02* (2012.01)

(52) U.S. Cl.
CPC ......... *F16D 55/22* (2013.01); *F16D 65/0006* (2013.01); *F16D 65/0978* (2013.01); *F16D 2127/02* (2013.01)

(58) Field of Classification Search
CPC ............... F16D 65/097; F16D 65/0972; F16D 65/0975; F16D 65/0977; F16D 65/0973; F16D 65/0974; F16D 65/0979; F16D 55/2262; F16D 2127/02; F16D 2055/0029; F16D 55/226; F16D 55/22; F16D 65/0006; F16D 65/0978

USPC ....................................................... 188/73.38
See application file for complete search history.

(56) References Cited

U.S. PATENT DOCUMENTS

| 3,986,164 | A | * | 10/1976 | Hirai | F16D 55/228 |
| | | | | | 340/454 |
| 4,491,204 | A | | 1/1985 | Dirauf et al. | |
| 5,249,647 | A | * | 10/1993 | Kobayashi | F16D 65/092 |
| | | | | | 188/72.3 |
| 5,511,638 | A | | 4/1996 | Tsuruta | |
| 5,549,181 | A | | 8/1996 | Evans | |
| 8,393,441 | B2 | | 3/2013 | Gutelius | |
| 8,857,575 | B2 | | 10/2014 | Philpott | |
| 10,309,470 | B1 | | 6/2019 | Philpott | |

(Continued)

FOREIGN PATENT DOCUMENTS

| CN | 104251271 A | 12/2014 |
| CN | 107850152 A | 3/2018 |

(Continued)

OTHER PUBLICATIONS

U.S. Appl. No. 16/407,395, filed May 9, 2019; 52 Pages.

(Continued)

*Primary Examiner* — Nicholas J Lane
*Assistant Examiner* — Stephen M Bowes
(74) *Attorney, Agent, or Firm* — Brooks Kushman PC

(57) ABSTRACT

A brake assembly having a retraction spring. The retraction spring may be mounted to a first brake pad module and a second brake pad module. The retraction spring may have an anti-rotation feature that inhibits rotation of the retraction spring. The anti-rotation feature may engage the first brake pad module.

26 Claims, 10 Drawing Sheets

(56) References Cited

U.S. PATENT DOCUMENTS

| | | | |
|---|---|---|---|
| 2002/0043436 A1* | 4/2002 | Burgdorf | F16D 65/0979 |
| | | | 188/73.38 |
| 2012/0186917 A1 | 7/2012 | Gutelius | |
| 2016/0053837 A1 | 2/2016 | Lou et al. | |
| 2016/0146278 A1 | 5/2016 | Roberts | |
| 2018/0106309 A1 | 4/2018 | Fricke et al. | |
| 2018/0106313 A1 | 4/2018 | Fricke et al. | |
| 2019/0234472 A1* | 8/2019 | Wilson | F16D 65/22 |
| 2019/0293133 A1 | 9/2019 | Brandl et al. | |
| 2022/0049747 A1 | 2/2022 | Cleary et al. | |
| 2022/0412414 A1* | 12/2022 | Meissner | F16D 65/0978 |

FOREIGN PATENT DOCUMENTS

| | | | | |
|---|---|---|---|---|
| CN | 110219906 A | | 9/2019 | |
| DE | 2718003 A1 | * | 10/1978 | F16D 65/097 |
| DE | 202010003738 U1 | | 7/2010 | |
| DE | 102011100160 A1 | | 11/2012 | |
| DE | 102017001089 A1 | | 8/2018 | |
| DE | 102018114396 A1 | | 12/2019 | |
| DE | 102018120512 A1 | | 2/2020 | |
| EP | 1241369 A2 | | 9/2002 | |
| EP | 2557330 A1 | | 2/2013 | |
| FR | 3067688 A1 | | 12/2018 | |
| GB | 1456004 A | * | 11/1976 | F16D 55/2262 |
| GB | 9211851 | | 7/1992 | |
| GB | 2 257 483 A | | 1/1993 | |
| JP | H02 92130 U | | 7/1990 | |
| JP | H02195033 A | | 8/1990 | |
| JP | 2003 148525 A | | 5/2003 | |
| JP | 2009127715 A | | 6/2009 | |
| JP | 2012189188 A | | 10/2012 | |
| KR | 1536079 B1 | * | 7/2015 | B23B 39/168 |
| WO | WO-9402752 A1 | * | 2/1994 | F16D 65/0975 |
| WO | 2014097098 A1 | | 6/2014 | |
| WO | 2017060515 A1 | | 4/2017 | |
| WO | 2018/234665 A1 | | 12/2018 | |
| WO | 2018234665 A1 | | 12/2018 | |
| WO | 2019068619 A1 | | 4/2019 | |

OTHER PUBLICATIONS

Extended European Search Report dated Jun. 25, 2021 for related European Appln. No. 21152725.4; 9 Pages.

Chinese Office Action dated Jul. 26, 2022 for related Chinese Appln. No. 202110177298.3; 10 Pages.

European Examination Report dated Mar. 27, 2023 for related European Appln. No. 21152725.4; 4 Pages.

* cited by examiner

BRAKE ASSEMBLY HAVING A RETRACTION SPRING

TECHNICAL FIELD

This document relates to a brake assembly having a retraction spring.

BACKGROUND

A disc brake having springs is disclosed in U.S. Pat. No. 4,491,204.

SUMMARY

In at least one embodiment, a brake assembly is provided. The brake assembly may include a brake carrier, a housing assembly, first and second brake pad modules, and at least one retraction spring. The housing assembly may be mounted to the brake carrier. The first brake pad module may include a first brake pad assembly that may be received in the brake carrier. The second brake pad module may include a second brake pad assembly that may be received in the brake carrier. The retraction spring may include a first end, a second end, a coil, and at least one anti-rotation feature. The first end may be mounted to the first brake pad assembly. The second end may be disposed opposite the first end and may be mounted to the second brake pad assembly. The coil may be disposed between the first end and the second end. The anti-rotation feature may be disposed between the first end and the coil. The anti-rotation feature may extend over and may engage the first brake pad module to inhibit rotation of the retraction spring.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
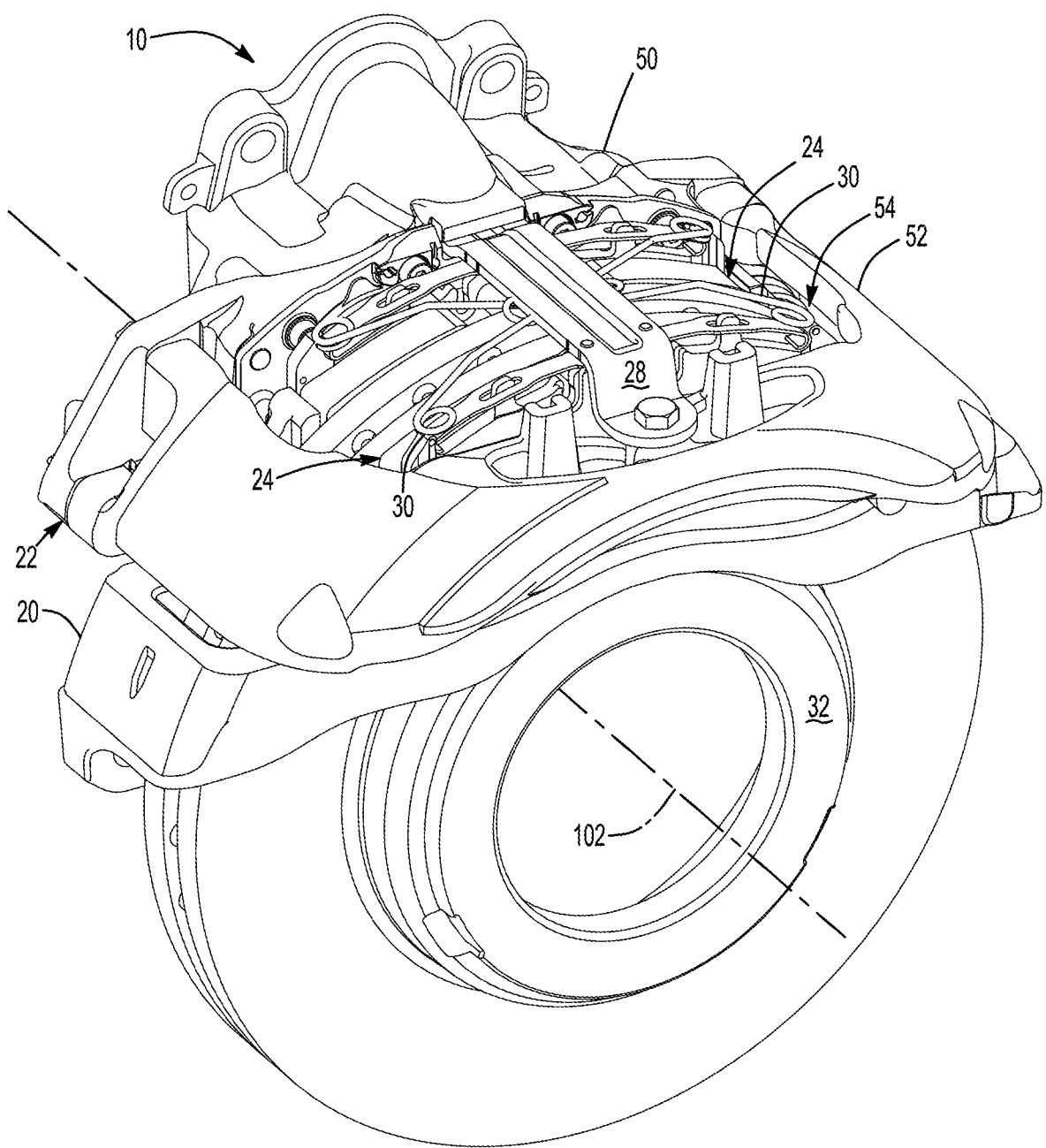
FIG. 1 is a perspective view of an example of a brake assembly.
Figure 2:
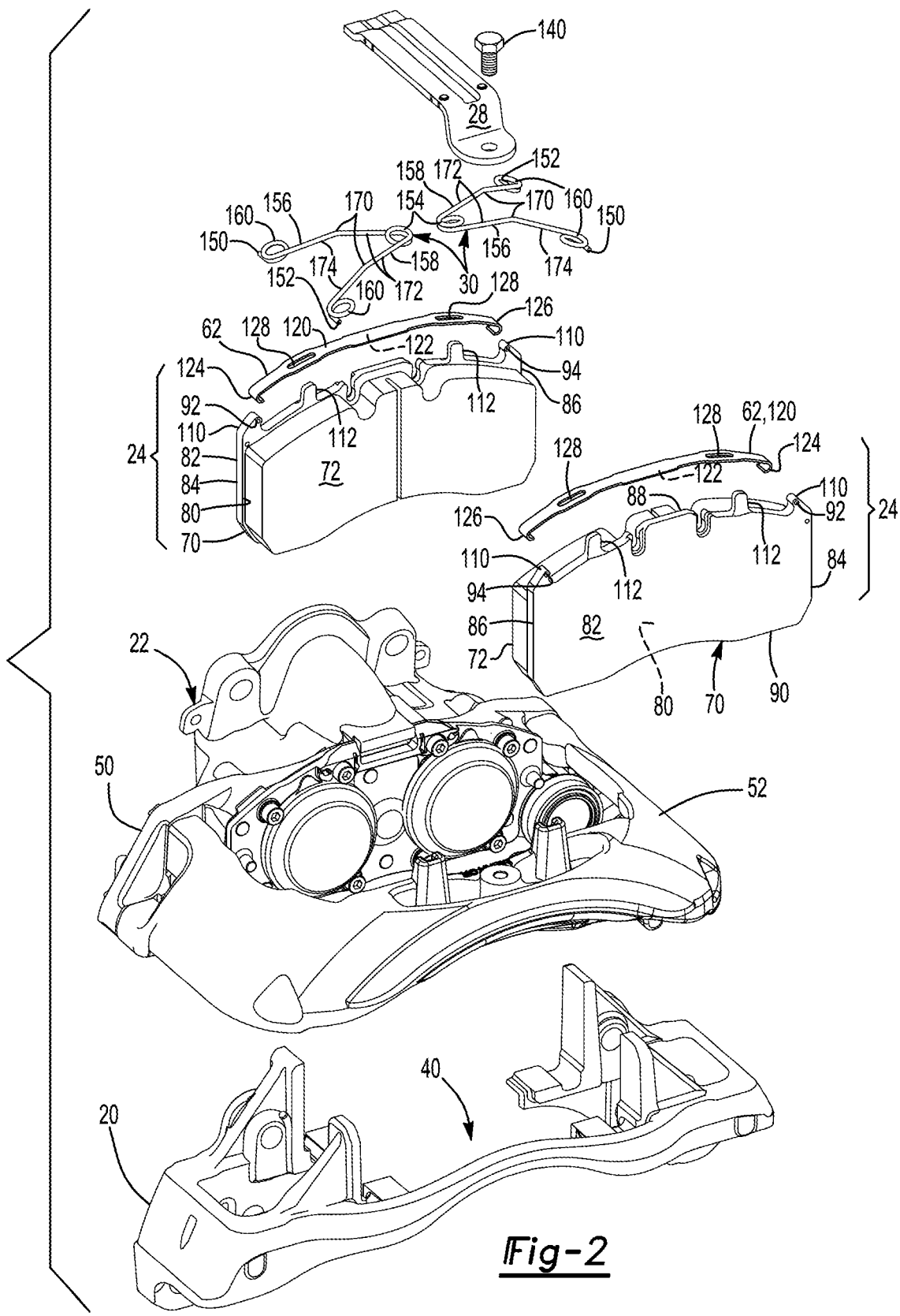
FIG. 2 is an exploded view of the brake assembly of FIG. 1.

Referring to FIGS. 1 and 2, an example of a brake assembly 10 is shown. The brake assembly 10 may be provided as part of a vehicle, such as a motor vehicle like a truck, bus, farm equipment, military transport or weaponry vehicle, or cargo loading equipment for land, air, or marine vessels. In at least one embodiment, the brake assembly 10 may include a brake carrier 20, a housing assembly 22, a pair of brake pad modules 24, a retainer bracket 28, and at least one retraction spring 30. Additionally, a rotor 32 may be provided that may be positioned between the pair of brake pad modules 24.

The brake carrier 20 may be fixedly mounted to the vehicle. For example, the brake carrier 20 may be directly or indirectly mounted to an axle assembly or a steering knuckle. The brake carrier 20 may receive and support the brake pad modules 24 and may include a rotor opening 40 that may receive the rotor 32. As such, the brake carrier 20 may straddle the rotor 32 and help position the brake pad modules 24 on opposite sides of the rotor 32.

The housing assembly 22 may receive various components of the brake assembly 10. In addition, the housing assembly 22 may facilitate positioning of the brake pad modules 24 with respect to the rotor 32 to facilitate braking of the vehicle. In at least one configuration, the housing assembly 22 may be mounted to the brake carrier 20 and may include a caliper housing 50 and a caliper bridge 52.

The caliper housing 50 may be movably disposed on the brake carrier 20. For example, the caliper housing 50 may be slidably disposed on a pair of slide pins that may be fixedly disposed on the brake carrier 20. The caliper housing 50 may receive an actuator, such as at least one piston, that may actuate the brake pad modules 24 into engagement with the rotor 32. For example, the actuator may actuate a first brake pad module 24 that is disposed adjacent to the caliper housing 50 into engagement with the rotor 32 and a reaction force may then move the caliper housing 50 and caliper bridge 52 with respect to the brake carrier 20 to actuate a second brake pad module 24 that is disposed adjacent to the caliper bridge 52 into engagement with an opposite side of the rotor 32 to help slow rotation of the rotor 32 and an associated vehicle wheel.

The caliper bridge 52 may be integrally formed with or may be fixedly disposed on the caliper housing 50. For example, the caliper bridge 52 may be coupled to the caliper housing 50 with one or more fasteners, such as bolts. In at least one configuration, the caliper bridge 52 may cooperate with the caliper housing 50 to at least partially define an opening 54. The brake pad modules 24, the retainer bracket 28, the retraction spring 30, or combinations thereof may be at least partially disposed in the opening 54.

A pair of brake pad modules 24 may be received in the brake carrier 20. The brake pad modules 24 may be disposed on opposite sides of the rotor 32 and may have similar or identical configurations. As such, one brake pad module 24 may be positioned between the caliper housing 50 and the rotor 32 while the other brake pad module 24 may be located on the opposite side of the rotor 32 and may be positioned between the caliper bridge 52 and the rotor 32. In at least one configuration, a brake pad module 24 may include a brake pad assembly 60, and optionally a pad spring 62.

The brake pad assembly 60 may be engageable with the rotor 32 to slow rotation of the rotor 32. As is best shown with reference to FIGS. 2 and 3, the brake pad assembly 60 may include a backplate 70 and friction material 72.

The backplate 70 may be a structural member of a brake pad module 24. The backplate 70 may be configured as a generally flat plate and may be made of any suitable material, such as metal or a metal alloy. In at least one configuration, the backplate 70 may include a first side 80, a second side 82, a first lateral side 84, a second lateral side 86, a top side 88, and a bottom side 90. The backplate 70 may also include a first hole 92 and a second hole 94.

The first side 80 may face toward the rotor 32 and toward a center plane 100 that may be disposed between the brake pad modules 24, 24. The first side 80 may be disposed substantially parallel to the center plane 100 and may be disposed substantially perpendicular to an axis of rotation of the rotor 32, which may be referred to as a rotor axis 102.

The second side 82 may be disposed opposite the first side 80. As such, the second side 82 may face away from the rotor 32 and away from the center plane 100. The second side 82 of an inboard brake pad assembly 60 may face toward the caliper housing 50 while the second side 82 of an outboard brake pad assembly 60 may face toward the caliper bridge 52.

The first lateral side 84 may extend from the first side 80 to the second side 82. In addition, the first lateral side 84 may extend between the top side 88 and the bottom side 90. The first lateral side 84 may face away from the retainer bracket 28 in a lateral direction.

The second lateral side 86 may be disposed opposite the first lateral side 84 and may extend substantially parallel to the first lateral side 84. The second lateral side 86 may extend from the first side 80 to the second side 82. In addition, the second lateral side 86 may extend between the top side 88 and the bottom side 90. The second lateral side 86 may also face away from the retainer bracket 28 in a lateral direction.

The top side 88 may face toward the retainer bracket 28. The top side 88 may also face toward the pad spring 62 if provided. The top side 88 may also extend from the first side 80 to the second side 82. The top side 88 may include one or more outboard protrusions 110 and optionally one or more inboard protrusions 112 that may extend away from the bottom side 90. The outboard protrusions 110 and the inboard protrusions 112 may be spaced apart from each other and may facilitate mounting and/or positioning of a pad spring 62 if provided.

The bottom side 90 may be disposed opposite the top side 88. As such, the bottom side 90 may face away from the retainer bracket 28 and the pad spring 62 if provided. The bottom side 90 may also extend from the first side 80 to the second side 82.

The first hole 92 may facilitate mounting of a retraction spring 30. The first hole 92 may extend from the first side 80 toward the second side 82. For example, the first hole 92 may be a through hole that may extend from the first side 80 to the second side 82. In at least one configuration, the first hole 92 may be disposed proximate the top side 88 of the backplate 70. In addition, the first hole 92 may be disposed proximate a lateral side of the backplate 70, such as the first lateral side 84. The first hole 92 may be disposed above the friction material 72 and may optionally be disposed adjacent to a protrusion or in a protrusion, such as an outboard protrusion 110.

The second hole 94 may also facilitate mounting of a retraction spring 30. The second hole 94 may extend from the first side 80 toward the second side 82. For example, the second hole 94 may be a through hole that may extend from the first side 80 to the second side 82. In at least one configuration, the second hole 94 may be disposed proximate the top side 88 of the backplate 70. In addition, the second hole 94 may be disposed proximate a lateral side of the backplate 70, such as the second lateral side 86. The second hole 94 may be disposed above the friction material 72 and may optionally be disposed adjacent to a protrusion or in a protrusion such as another outboard protrusion 110.

Figure 8:
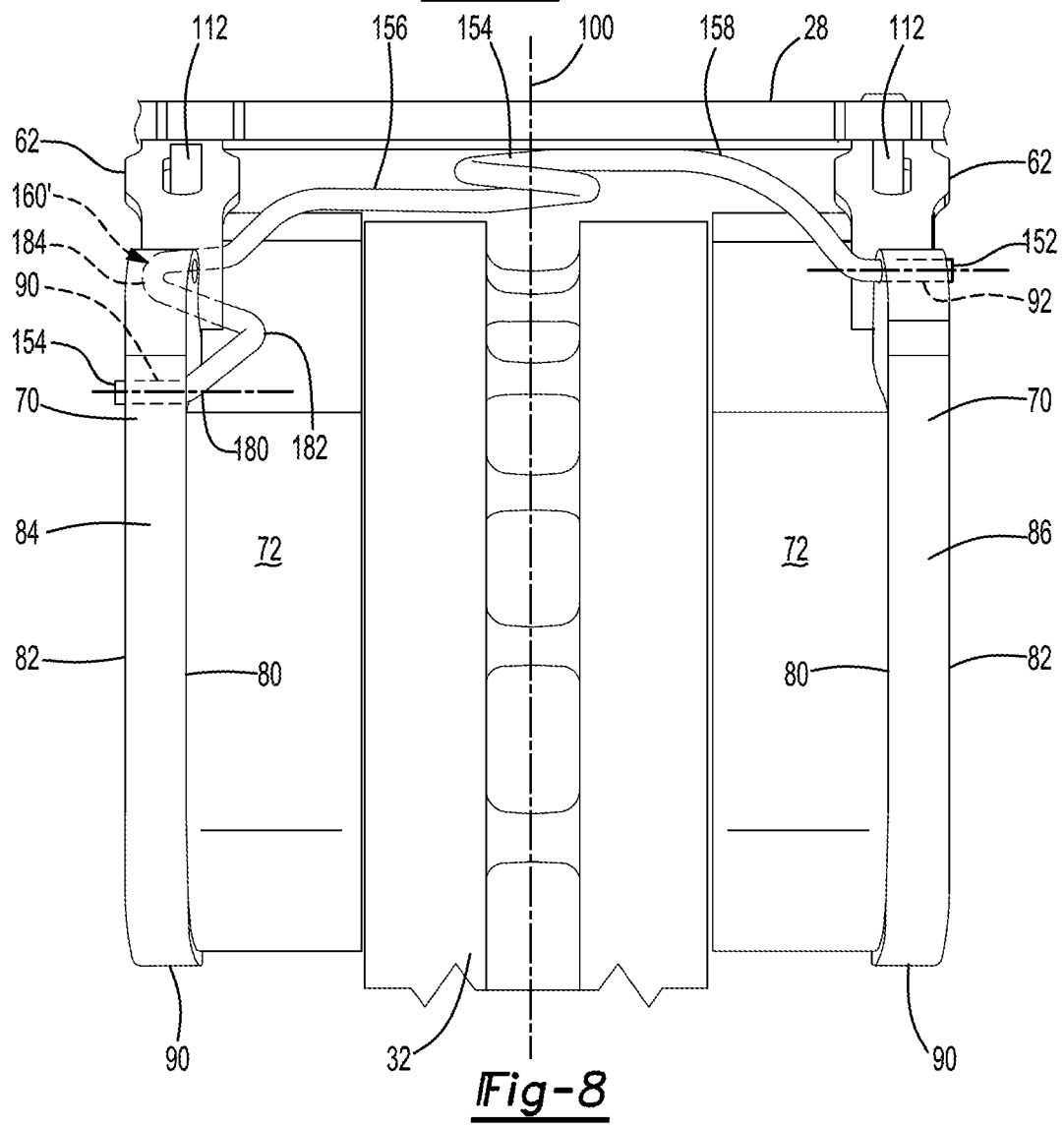
FIG. 8 is a side view of a portion of the brake assembly of FIG. 6 showing an installed retraction spring.

The first hole 92 and the second hole 94 may be disposed at the same distance or at different distances from the bottom side 90 of the backplate 70. In FIG. 2, the first hole 92 and second hole 94 are depicted at substantially the same height from the bottom side 90. In FIG. 8, the first hole 92 and the second hole 94 are depicted at different distances or different heights from the bottom side 90. For instance, the first hole 92 may be disposed closer to the bottom side 90 than the second hole 94. In such a configuration, the first hole 92 of the backplate 70 of a first brake pad assembly 60 may be offset from and may not be coaxially disposed with the second hole 94 of a second brake pad assembly 60 that may be disposed on the opposite side of the rotor 32 from the first brake pad assembly 60. Such a configuration may prevent improper installation of the retraction spring 30, such as by preventing installation of a retraction spring 30 in an inverted or upside-down position. The first hole 92 and the second hole 94 may be disposed parallel or substantially parallel to each other.

Figure 3:
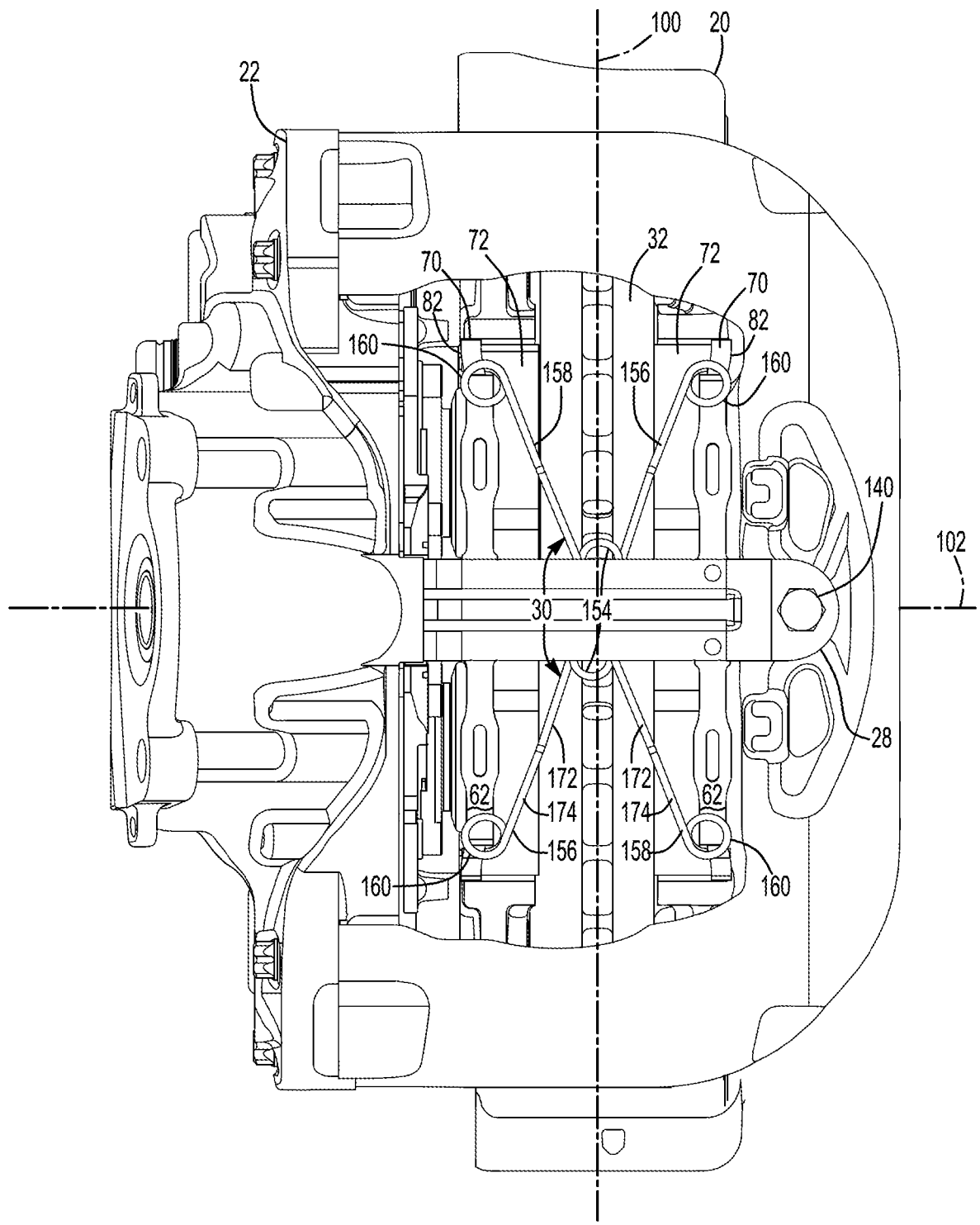
FIG. 3 is a top view of the brake assembly of FIG. 1 with retraction springs having a first configuration.

Referring to FIGS. 2 and 3, the friction material 72 may be disposed on the first side 80 of the backplate 70. The friction material 72 may face toward the rotor 32 and may contact the rotor 32 during vehicle braking.

The pad spring 62, if provided, may exert a biasing force against the brake pad assembly 60 that may help hold the brake pad assembly 60 against the brake carrier 20. The pad spring 62 may be mounted to the backplate 70 and may extend across the top side 88 of the backplate 70. For instance, the pad spring 62 may generally extend along an arc and may engage one or more outboard protrusions 110 of the backplate 70 to help secure the pad spring 62 to the backplate 70. In at least one configuration, the pad spring 62 may include an upper side 120, a lower side 122, a first pad spring mount 124, a second pad spring mount 126, and one or more openings 128.

The upper side 120 may face away from the top side 88 of the backplate 70 and may engage or contact the retainer bracket 28. The upper side 120 may extend between the first pad spring mount 124 and the second pad spring mount 126.

The lower side 122 may be disposed opposite the upper side 120. As such, the lower side 122 may face toward the top side 88 of the backplate 70. As is best shown in FIG. 5, at least a portion of the lower side 122 may be spaced apart from the top side 88 such that a gap 130 may be provided between the lower side 122 of the pad spring 62 and the top side 88 of the backplate 70.

Figure 5:
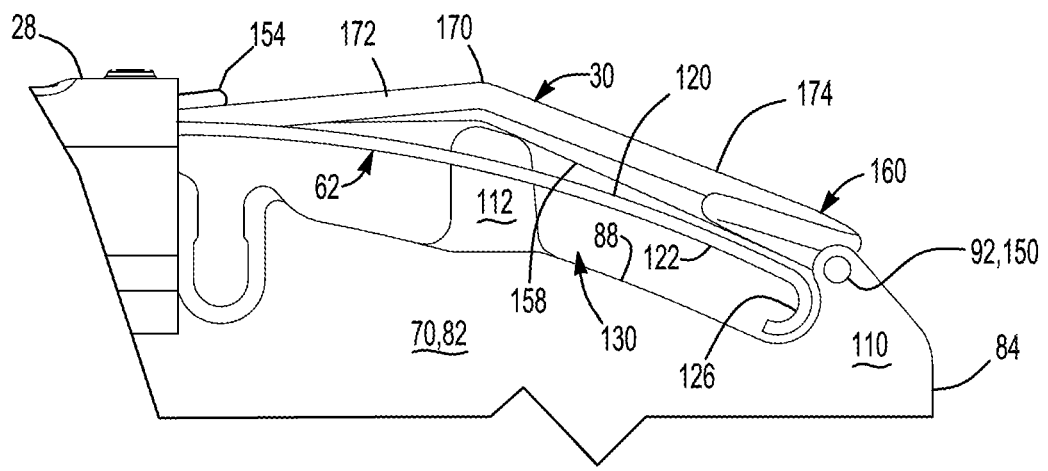
FIG. 5 is a lateral side view of a portion of the brake assembly showing a portion of the retraction springs depicted in FIGS. 3 and 4.

Referring to FIGS. 2 and 5, the first pad spring mount 124 and the second pad spring mount 126 may be disposed at opposite ends of the pad spring 62 and may engage the backplate 70. For instance, the first pad spring mount 124 and the second pad spring mount 126 may engage corresponding outboard protrusions 110 of the backplate 70 to help secure and exert tension on the pad spring 62.

Optionally, one or more openings 128 may be provided in the pad spring 62. An opening 128 may be configured as a through hole that may receive an inboard protrusion 112 of the backplate 70 to help position the pad spring 62 and inhibit unintended movement of the pad spring 62 toward or away from the rotor 32 that may result in disengagement of the pad spring 62 from the backplate 70.

Referring to FIGS. 1 and 2, the retainer bracket 28 may be removably mounted to the housing assembly 22. For example, the retainer bracket 28 may extend across the brake pad modules 24 and the opening 54 in the housing assembly 22 to help retain the brake pad modules 24 in the brake carrier 20 when the retainer bracket 28 is secured to the housing assembly 22. In addition, the retainer bracket 28 may engage or contact the retraction spring 30 to help inhibit movement of the retraction spring 30 when the retainer bracket 28 is secured to the housing assembly 22. The retainer bracket 28 may engage or contact the pad spring 62 and exert force against the pad spring 62, if provided, when the retainer bracket 28 is installed and secured to the housing assembly 22. Conversely, the retainer bracket 28 may be detached from or removed from the housing assembly 22 to permit removal of the brake pad modules 24 or installation of the brake pad modules 24 via the opening 54. In at least one configuration, the retainer bracket 28 may have a first end and a second end that may be disposed opposite the first end. The first end of the retainer bracket 28 may be mounted to the caliper housing 50. The second end of the retainer bracket 28 may be secured to the caliper bridge 52 such as with a fastener 140 like a bolt. The retainer bracket 28 may be disposed above the rotor axis 102 and may extend generally parallel to the rotor axis 102. The retainer bracket 28 may inhibit rotation of the retraction spring 30 away from the brake pad modules 24 and the rotor 32.

Optionally, the retainer bracket 28 may help secure a pad shield if provided. The pad shield may be at least partially received in the opening 54 and may extend across and may at least partially cover the brake pad modules 24, 24. The pad shield may help shield the friction material 72 of the brake pad modules 24, 24 from water or contaminants.

Referring to FIGS. 1-3, at least one retraction spring 30 may be provided with the brake assembly 10. For instance, first and second retraction springs 30 may be provided that may extend in opposite lateral directions from the retainer bracket 28. The retraction spring 30 may extend from the first brake pad module 24 to the second brake pad module 24 and may exert a biasing force that may bias the first brake pad module 24 and the second brake pad module 24 away from each other. As such, the retraction spring 30 may urge the first brake pad module 24 and the second brake pad module 24 to move away from each other and away from the rotor 32 when a sufficient counteracting force is not provided by the actuator of the housing assembly 22.

The retraction spring may be provided in various configurations. In each configuration, the retraction spring may include a first end 150, a second end 152, a coil 154, a first arm 156, a second arm 158, and at least one anti-rotation feature 160.

The first end 150 may be mounted to the first brake pad module 24. For example, the first end 150 of the retraction spring 30 may be inserted into and may be received in the first hole 92 of the backplate 70 of the first brake pad assembly 60. In at least one configuration, the first end 150 may not be coplanar with the coil 154, the first arm 156, the anti-rotation feature 160, or combinations thereof when the retraction spring is installed or when the retraction spring is not installed and is in a free state or uncompressed state.

The second end 152 may be disposed opposite the first end 150. The second end 152 may be mounted to the second brake pad module 24. For example, the second end 152 of the retraction spring 30 may be inserted into and may be received in the second hole 94 of the backplate 70 of the second brake pad assembly 60. In at least one configuration, the first end 150 may not be coplanar with the coil 154, the second arm 158, the anti-rotation feature 160, or combinations thereof when the retraction spring is installed or when the retraction spring is not installed and is in a free state or uncompressed state.

The coil 154 may be disposed between the first end 150 and the second end 152. The coil 154 may engage the retainer bracket 28. For instance, the coil 154 may contact a side of the retainer bracket 28 that may face toward the rotor 32 and the opening 54 of the housing assembly 22. As such, the retainer bracket 28 may inhibit movement of the coil 154 away from the rotor 32.

The first arm 156 may extend from the coil 154 toward the first end 150. For instance, the first arm 156 may extend from the coil 154 to the anti-rotation feature 160. In at least one configuration, the first arm 156 may include an arm bend 170 that may be disposed between and may be spaced apart from the coil 154 and the anti-rotation feature 160. More specifically, the arm bend 170 may be located between a first segment 172 of the first arm 156 that may extend from the coil 154 to the arm bend 170 and a second segment 174 of the first arm 156 that may extend from the arm bend 170 to the anti-rotation feature 160. The first segment 172 and the second segment 174 may be disposed at an oblique angle with respect to each other such that the second segment 174 may extend downward toward the backplate 70 at the arm bend 170.

The second arm 158 may extend from the coil 154 toward the second end 152. The second arm 158 may have a similar configuration or a different configuration than the first arm 156.

In the configuration shown in FIGS. 2 and 3, the second arm 158 is substantially a mirror image of the first arm 156, may extend from the coil 154 to another anti-rotation feature 160, and may have an arm bend 170 that may be located between a first segment 172 and a second segment 174 of the second arm 158.

Figure 4:
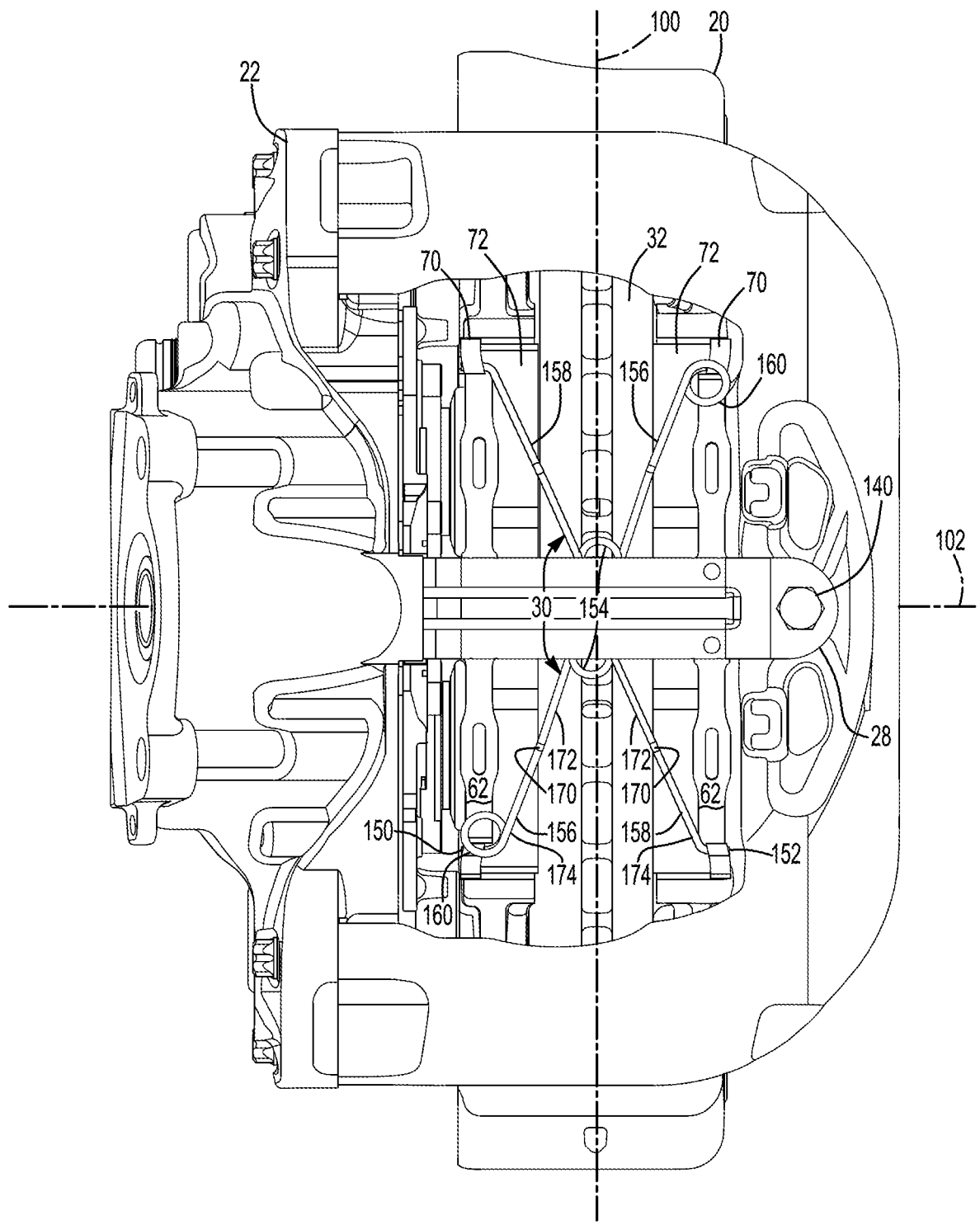
FIG. 4 is a top view of the brake assembly with retraction springs having a second configuration.

In the configuration shown in FIG. 4, the second arm 158 is provided without an anti-rotation feature 160. In such a configuration, the second arm 158 may extend from the coil 154 to the second end 152. Accordingly, the second arm 158 may have an arm bend 170 that may be located between the first segment 172 and the second segment 174 of the second arm 158 and the second segment 174 may extend from the arm bend 170 to the second end 152.

Referring to FIGS. 2-4, at least one anti-rotation feature 160 may be provided with the retraction spring 30. The anti-rotation feature 160 be disposed between the coil 154 and the first end 150, between the coil 154 and the second end 152, or both. The anti-rotation feature 160 may engage a brake pad module 24 to inhibit rotation of the retraction spring 30 toward the rotor 32, thereby inhibiting or preventing contact of the retraction spring 30 and the rotor 32. Moreover, the force exerted by the anti-rotation feature 160 that inhibits rotation of the retraction spring 30 toward the rotor 32 and the force exerted by the retainer bracket 28 against the coil 154 may place the retraction spring 30 in tension such that the retraction spring 30 is inhibited from rotating with respect to the brake pad modules 24, 24 toward the rotor 32 or away from the rotor 32 while allowing the first arm 156 and the second arm 158 to move toward and away from each other to facilitate movement of the brake pad modules 24, 24 toward the rotor 32 during braking and away from the rotor 32 when braking is not desired.

An anti-rotation feature 160 may extend over and may engage a corresponding brake pad module 24 or adjacent brake pad module 24 to inhibit rotation of the retraction spring 30 toward the rotor 32. For example, an anti-rotation feature 160 may be disposed above at least a portion of a corresponding brake pad module 24 and may contact the corresponding brake pad module 24 to inhibit rotation of the coil 154 away from the retainer bracket 28 and toward the rotor 32. The anti-rotation feature 160 may contact or may engage the brake pad assembly 60, the pad spring 62, or the brake pad assembly 60 and the pad spring 62 in one or more configurations.

In the configurations shown in FIGS. 2-5, the anti-rotation feature 160 may be configured as a coil. In FIG. 2-5, the anti-rotation feature 160 is illustrated as being located above a portion of the pad spring 62 and the backplate 70. In such a configuration, the anti-rotation feature 160 may engage the pad spring 62, the backplate 70, or both. For instance, the anti-rotation feature 160 may contact the upper side 120 of the pad spring 62, an outboard protrusion 110 of the backplate 70, or both. It is also contemplated that the anti-rotation feature 160 could be positioned between the pad spring 62 and the top side 88 of the backplate 70 and that the anti-rotation feature 160 may contact the lower side 122 of the pad spring 62, the top side 88 of the backplate 70, or both.

Figure 6:
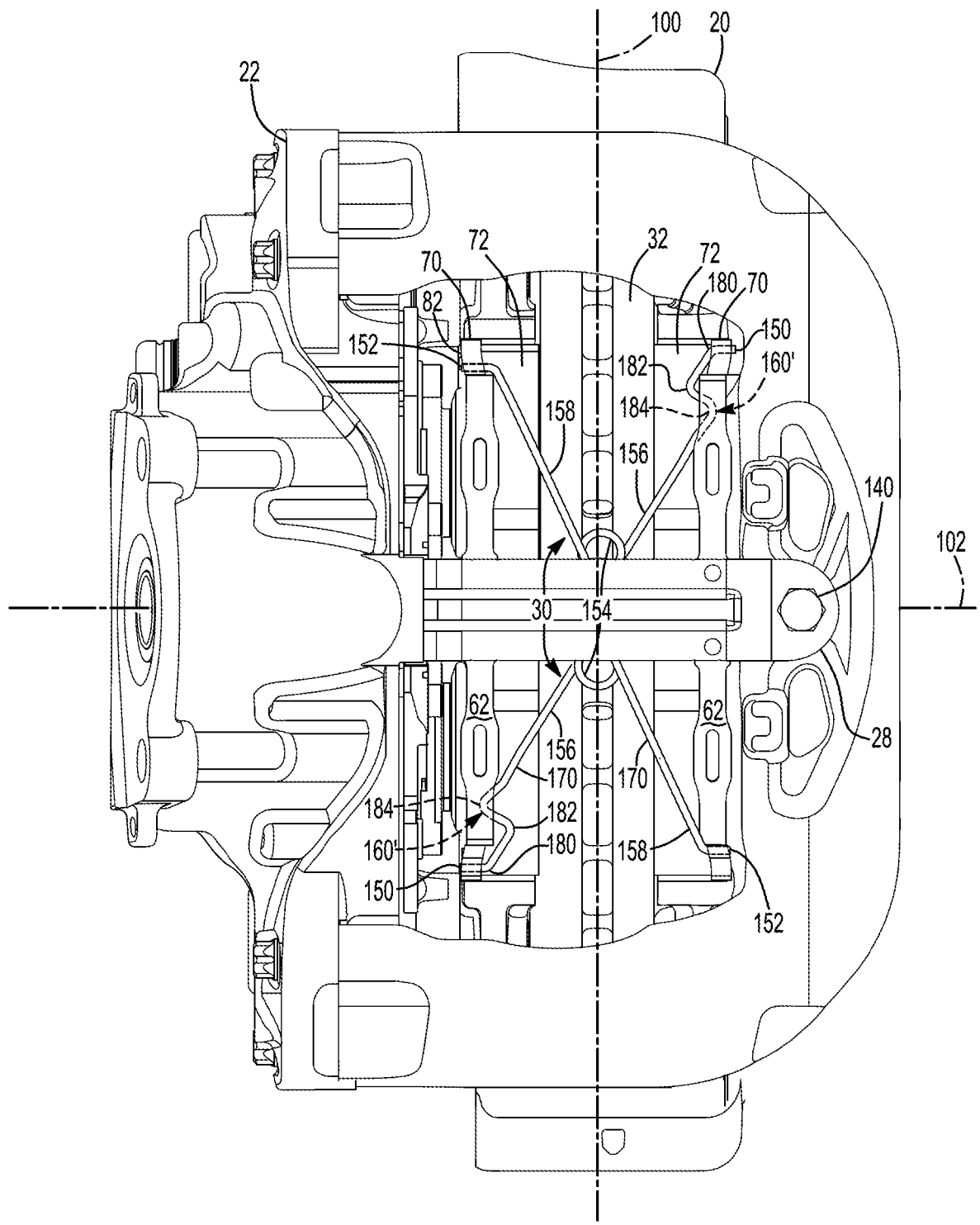
FIG. 6 is a top view of the brake assembly with retraction springs having a third configuration.
Figure 7:
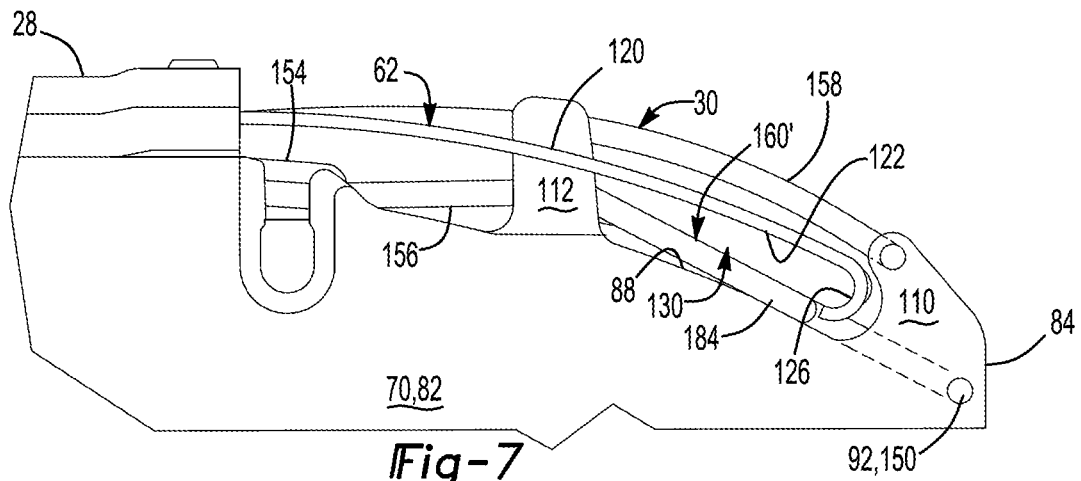
FIG. 7 is a lateral side view of a portion of the brake assembly showing a portion of the retraction spring depicted in FIG. 6.

Referring to FIGS. 6-8, another configuration of an anti-rotation feature 160' is shown. In this configuration, the anti-rotation feature 160' may include a plurality of bends. For instance, the anti-rotation feature 160' may include a first bend 180, a second bend 182, and a third bend 184.

The first bend 180 may be positioned between the first end 150 and the second bend 182 and may be located above the friction material 72 of the brake pad assembly 60 to which the first end 150 is mounted. As such, the first bend 180 may be positioned between the backplate 70 and the rotor 32. The retraction spring 30 may extend at an angle toward the center of the brake assembly 10 or toward the retainer bracket 28 at the first bend 180.

The second bend 182 may be located between the first bend 180 and the coil 154. For example, the second bend 182 may be located between the first bend 180 and the third bend 184. The second bend 182 may be located closer to the retainer bracket 28 than the first bend 180, may be disposed above the friction material 72, and may be located further from the backplate 70 than the first bend 180. The retraction spring 30 may extend toward the backplate 70 and away from the rotor 32 at an angle between the second bend 182 and the third bend 184.

The third bend 184 may be located between the second bend 182 and the coil 154. For example, the third bend 184 may be located between the second bend 182 and the arm bend 170. The third bend 184 may be located closer to the retainer bracket 28 than the second bend 182 and may be disposed closer to the backplate 70 than the second bend 182. For instance, the third bend 184 may be disposed above the backplate 70 and may contact the backplate 70. The retraction spring 30 may extend from the third bend 184 toward the coil 154 and the retainer bracket 28.

In FIG. 7, the anti-rotation feature 160' is illustrated as being located in the gap 130 between the backplate 70 and the pad spring 62. In such a configuration, the anti-rotation feature 160' may engage the backplate 70 and optionally the pad spring 62 depending on the thickness and/or orientation of the anti-rotation feature 160'. For instance, the anti-rotation feature 160' may be disposed between the top side 88 of the backplate 70 and the lower side 122 of the pad spring 62 and may contact at least the top side 88 of the backplate 70. As an example, the third bend 184 may contact the top side 88 of the backplate 70 and may be spaced apart from the pad spring 62.

Figure 9:
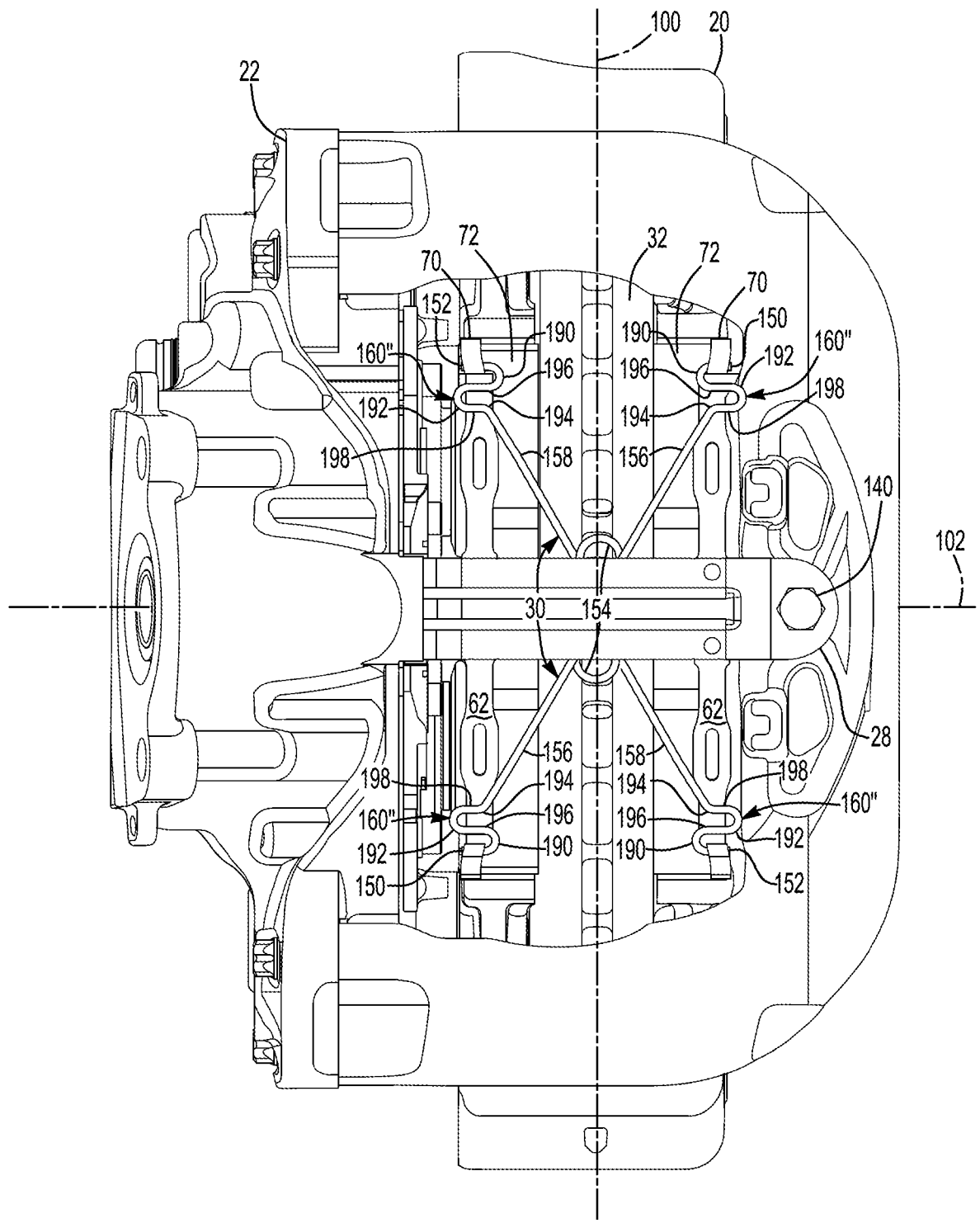
FIG. 9 is a top view of the brake assembly with retraction springs having a fourth configuration.
Figure 10:
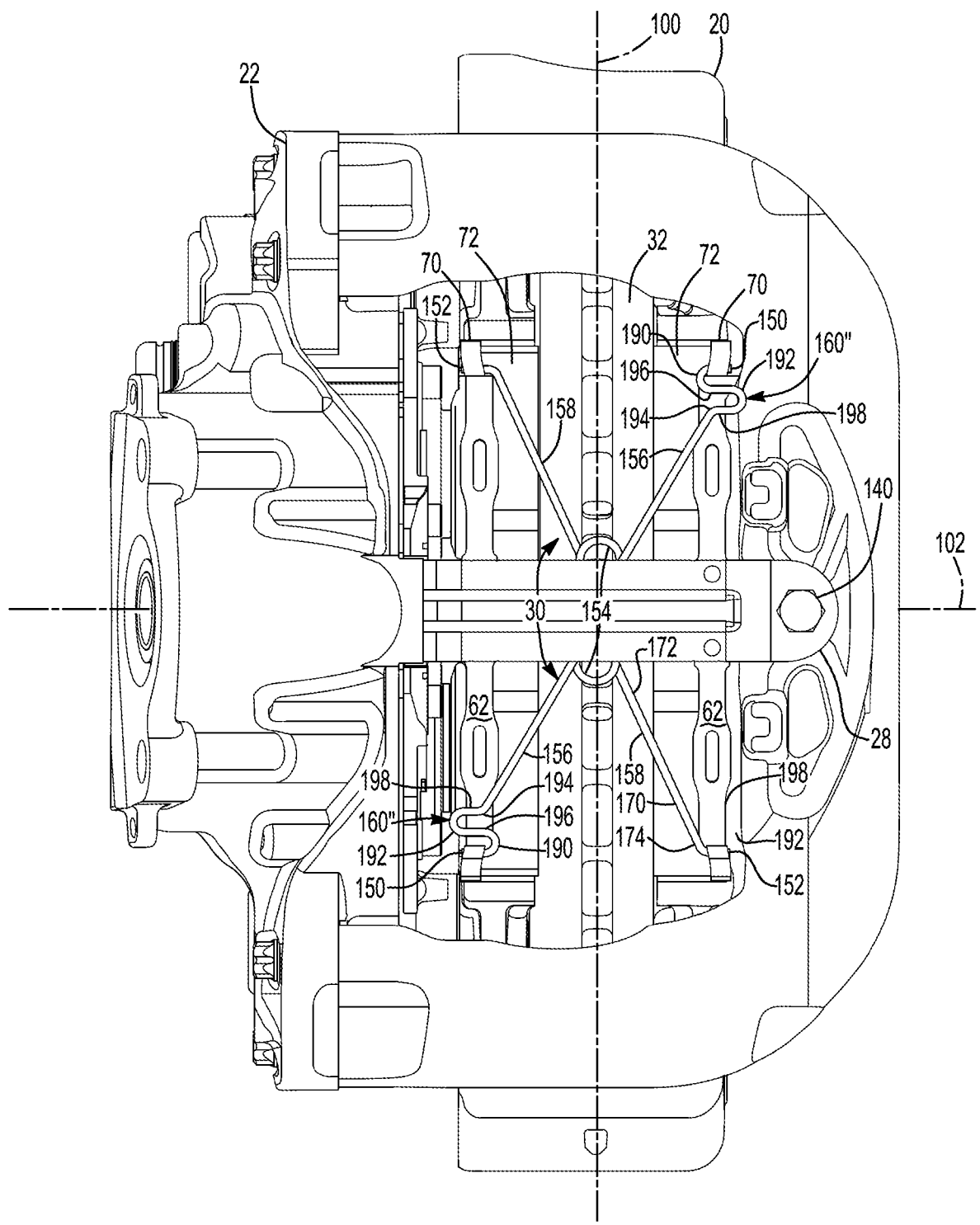
FIG. 10 is a top view of the brake assembly with retraction springs having a fifth configuration.
Figure 11:
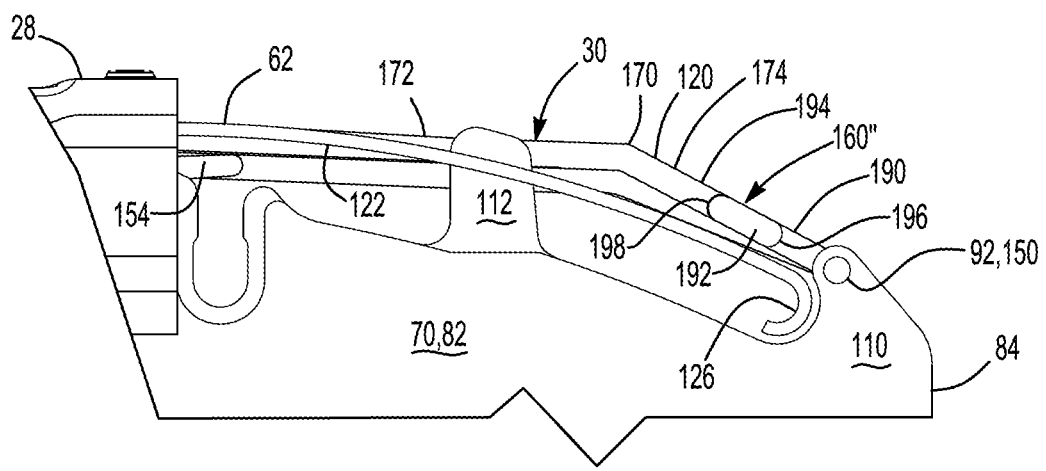
FIG. 11 is a lateral side view of a portion of the brake assembly showing a portion of the retraction springs depicted in FIGS. 9 and 10.

Referring to FIG. 9-11, another configuration of an anti-rotation feature 160" is shown. In this configuration, the anti-rotation feature 160" may have a serpentine configuration that may include a plurality of bends. For instance, the anti-rotation feature 160" may include a first bend 190, a second bend 192, a third bend 194, a first segment 196, and a second segment 198.

The first bend 190 may be positioned between the first end 150 and the second bend 192. Moreover, the first bend 190 may extend from the first end 150 to the first segment 196. The first bend 190 may be located above the friction material 72 of the brake pad assembly 60 which the first end 150 is mounted. As such, the first bend 190 may be positioned between the backplate 70 and the rotor 32. The first bend 190 may extend along an arc of approximately 180°. Accordingly, the retraction spring 30 may initially extend toward the rotor 32, may then curve toward the center of the brake assembly 10, and may then curve away from the rotor 32 and to the first segment 196.

The second bend 192 may be located between the first bend 190 and the third bend 194. For example, the second bend 182 may extend from the first segment 196 to the second segment 198. The second bend 192 may be located closer to the retainer bracket 28 than the first bend 190 and may be disposed further from the rotor 32 than the first bend 190, the first segment 196, and the second segment 198. In addition, the second bend 192 may be located above the backplate 70 or may be located behind the second side 82 of the backplate 70 that faces away from the rotor 32. The second bend 192 may extend along an arc approximately 180°. Accordingly, the retraction spring 30 may initially extend away from the rotor 32, may then curve toward the center of the brake assembly 10, and may then curve toward the rotor 32 and to the second segment 198.

The third bend 194 be located between the second bend 192 and the coil 154. For example, the third bend 194 may extend at an oblique angle from the end of the second segment 198 that is disposed opposite the second bend 192 toward the arm bend 170 and the coil 154. The third bend 184 may be located closer to the retainer bracket 28 than the first bend 190, the second bend 192, the first segment 196, and the second segment 198. For instance, the third bend 184 may be disposed above the backplate 70, the friction material 72, or both.

The first segment 196 may extend from an end of the first bend 190 to an end of the second bend 192. The first segment 196 may be primarily disposed above the backplate 70.

The second segment 198 may extend from an end of the second bend 192 that may be disposed opposite the first segment 196 to the third bend 194. The second segment 198 may be primarily disposed above the backplate 70 and may extend substantially parallel to the first segment 196 in one or more configurations. As is best shown in FIG. 11, the first segment 196, the second segment 198, or both may contact the pad spring 62. For instance, the first segment 196, the second segment 198, or both may contact the upper side 120 of the pad spring 62. It is also contemplated that the second bend 192 may contact the pad spring 62, such as may occur of the first segment 196 and second segment 198 were shortened.

The retraction springs shown in FIG. 10 are similar to that shown in FIG. 9 but are provided with a single anti-rotation feature 160". More specifically, the second arm 158 is provided without an anti-rotation feature 160". In such a configuration, the second arm 158 may extend from the coil 154 to the second end 152. The second arm 158 may also have an arm bend 170 that may be located between the first segment 172 and the second segment 174 of the second arm 158 and the second segment 174 may extend from the arm bend 170 to the second end 152.

The retraction springs described above can be assembled to one or more brake pad modules before or after the brake pad modules are received in the brake carrier. For instance, a free ends of a retraction spring can be inserted into a corresponding hole in a backplate before or after the backplate is received in the brake carrier. It is contemplated that the brake pad modules may be retracted away from the center plane prior to installing a retraction spring. Moreover, it is contemplated that the brake assembly may be actuated to assist with assembly, that a tool like a prybar or screwdriver, may assist with assembly, or both. For instance, a tool may engage a portion of a retraction spring, such as the anti-rotation feature, and force may be exerted with the tool to align and seat a free end of the retraction spring into a hole in the backplate. In addition, it is contemplated that an anti-rotation feature may inhibit inverted or upside down installation of a retraction spring whether or not the holes in the backplates that receive the free ends of an anti-rotation spring are offset or not coaxially disposed. For example, the configuration or height of an anti-rotation spring that is configured as a coil may inhibit or prevent inverted or upside-down installation in that the coil may contact a brake pad module in a manner that prevents both free ends of the retraction spring from being received in holes in both backplates when the retraction spring is inverted yet allow the free ends to be received in the holes in both backplates when the retraction spring is properly oriented. In at least one configuration, the coil may coil away from the backplate such that the end of the retainer spring that mountable to the backplate is disposed closer to the backplate when properly oriented than a segment of the arm that extends from the coil, such as the second segment. As such, the coil and relative positioning of the mountable end and arm that extend from the coil may cooperate to inhibit improper installation, such as inverted or upside-down installation of a retainer spring.

The configurations described above may allow a brake assembly to be provided with retraction springs that are inhibited from rotating toward a rotor, thereby helping avoid contact between a retraction spring and the rotor. The retraction springs and associated anti-rotation features may be cost-effectively manufactured, such as with wire extrusion and/or bending processes, and may be configured so that a retraction spring can only be installed a desired orientation, thereby avoiding incorrect assembly during initial assembly or when a retraction spring is replaced or reinstalled.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake assembly comprising:
   a brake carrier;
   a housing assembly that is moveably disposed on the brake carrier;
   a first brake pad module that comprises:
      a first brake pad assembly that is received in the brake carrier, the first brake pad assembly comprising a first backplate that includes first and second inboard protrusions and first and second outboard protrusions that extend from a top side of the first backplate, wherein first and second holes are disposed in the first and second outboard protrusions, respectively;
      a pad spring that includes first and second pad spring mounts disposed at opposite ends of the pad spring that contact the first and second outboard protrusions, respectively, and first and second openings that are configured as through holes, wherein the first and second inboard protrusions extend through the first and second openings, respectively;
   a second brake pad module that comprises:
      a second brake pad assembly that is received in the brake carrier and that comprises a second backplate that includes first and second inboard protrusions and first and second outboard protrusions that extend from a top side of the second backplate, wherein first and second holes are disposed in the first and second outboard protrusions, respectively, of the second backplate; and
   a retraction spring that includes:
      a first end is received in the first hole in the first outboard protrusion of the first backplate;
      a second end that is disposed opposite the first end and that is received in the second hole of the second outboard protrusion of the second backplate;
      a coil that is disposed between the first end and the second end; and
      an anti-rotation feature that is disposed between the first end and the coil and that extends over and contacts the first brake pad module to inhibit rotation of the retraction spring; and
   a retainer bracket that is secured to the housing assembly and extends across the first brake pad module and the second brake pad module, wherein the anti-rotation feature inhibits rotation of the retraction spring away from the retainer bracket and the retainer bracket inhibits rotation of the retraction spring away from the first brake pad assembly and the second brake pad assembly, wherein the retainer bracket is completely spaced apart from the brake carrier, and the first and second inboard protrusions are disposed closer to the retainer bracket than the first and second outboard protrusions.

2. The brake assembly of claim 1 wherein the retraction spring includes a second anti-rotation feature that is disposed between the second end and the coil and that engages the second brake pad module.

3. The brake assembly of claim 1 wherein the coil engages the retainer bracket.

4. The brake assembly of claim 1 wherein the anti-rotation feature is disposed above the first brake pad module.

5. The brake assembly of claim 1 wherein the anti-rotation feature contacts the first backplate.

6. The brake assembly of claim 1 wherein the first hole in the first backplate is offset from the second hole in the second backplate such that the first hole and the second hole are not coaxially disposed.

7. The brake assembly of claim 1 wherein the anti-rotation feature is a coil.

8. The brake assembly of claim 1 wherein the retraction spring includes a first arm that extends from the anti-rotation feature to the coil and a second arm that extends from the coil to the second end.

9. The brake assembly of claim 1 wherein the retainer bracket is secured to the housing assembly with a fastener such that the retainer bracket and housing assembly are moveable with respect to the brake carrier.

10. The brake assembly of claim 1 wherein the retainer bracket is directly mounted to the housing assembly.

11. The brake assembly of claim 1 wherein the anti-rotation feature engages the pad spring.

12. The brake assembly of claim 11 wherein the anti-rotation feature contacts an upper side of the pad spring that faces away from the first backplate.

13. The brake assembly of claim 11 wherein the anti-rotation feature contacts the first backplate.

14. The brake assembly of claim 1 wherein a center plane is disposed between the first brake pad module and the second brake pad module, the first brake pad assembly includes a friction material that is disposed on the first backplate and that faces toward the center plane, and wherein the anti-rotation feature includes a first bend that is positioned between the first backplate and the second backplate, and a second bend that is located between the first bend and the coil.

15. The brake assembly of claim 14 wherein the second bend is disposed above the friction material.

16. The brake assembly of claim 14 wherein the second bend is positioned behind the first backplate.

17. The brake assembly of claim 14 wherein the anti-rotation feature includes a third bend that is located between the second bend and the coil.

18. The brake assembly of claim 17 wherein the third bend contacts the first backplate.

19. The brake assembly of claim 17 wherein a first segment extends from the first bend to the second bend and a second segment extends from the second bend to the third bend, wherein the first segment and the second segment are disposed above the first backplate and are disposed substantially parallel to each other.

20. A brake assembly comprising:
 a brake carrier configured to be fixedly mounted to a vehicle;
 a housing assembly that is moveably disposed on the brake carrier;
 a first brake pad module that comprises:
  a first brake pad assembly that is received in the brake carrier, the first brake pad assembly comprising a first backplate that includes first and second inboard protrusions and first and second outboard protrusions that extend from a top side of the first backplate, wherein first and second holes are disposed in the first and second outboard protrusions, respectively;
  a pad spring that includes first and second pad spring mounts disposed at opposite ends of the pad spring that contact the first and second outboard protrusions, respectively, and first and second openings that are configured as through holes, wherein the first and second inboard protrusions extend through the first and second openings, respectively;
 a second brake pad module that comprises:
  a second brake pad assembly that is received in the brake carrier and that comprises a second backplate that includes first and second inboard protrusions and first and second outboard protrusions that extend from a top side of the second backplate, wherein first and second holes are disposed in the first and second outboard protrusions, respectively, of the second backplate; and
 a retraction spring that includes:
  a first end that is received in the first hole in the first outboard protrusion of the first backplate;
  a second end that is disposed opposite the first end and that is received in the second hole of the second outboard protrusion of the second backplate;
  a first arm that extends from the first end;
  a second arm that extends from the second end; and
  an anti-rotation feature that is disposed on the first arm between the first end and the second arm and that extends over and engages the first brake pad module to inhibit rotation of the retraction spring; and
 a retainer bracket that is secured to the housing assembly and extends across the first brake pad module and the second brake pad module, wherein the anti-rotation feature inhibits rotation of the retraction spring away from the retainer bracket and the retainer bracket inhibits rotation of the retraction spring away from the first brake pad assembly and the second brake pad assembly, wherein the retainer bracket is completely spaced apart from the brake carrier, and the first and second inboard protrusions are disposed closer to the retainer bracket than the first and second outboard protrusions.

21. The brake assembly of claim 20 wherein the retraction spring contacts a side of the retainer bracket that faces toward a rotor.

22. The brake assembly of claim 20 wherein the anti-rotation feature contacts the first backplate of the first brake pad assembly.

23. The brake assembly of claim 20 wherein the first and second outboard protrusions of the first backplate each define an arcuate recess in which the first and second pad spring mounts, respectively, are received and the first and second holes are at least partially disposed above the first and second pad spring mounts.

24. The brake assembly of claim 20 wherein the retraction spring does not contact the pad spring between the first and second inboard protrusions of the first backplate.

25. The brake assembly of claim 20 wherein the anti-rotation feature engages the pad spring.

26. The brake assembly of claim 25 wherein the anti-rotation feature contacts an upper side of the pad spring that faces away from the first backplate.

* * * * *